United States Patent [19]

Shepherd

[11] 3,948,088
[45] Apr. 6, 1976

[54] MEASURING APPARATUS
[75] Inventor: Bryan Oliver Shepherd, Bournemouth, England
[73] Assignee: Portasilo Research Limited, Christchurch, England
[22] Filed: Jan. 29, 1973
[21] Appl. No.: 327,666

[30] Foreign Application Priority Data
Feb. 17, 1972 United Kingdom.............. 7475/72

[52] U.S. Cl............................................. 73/88 R
[51] Int. Cl.² ........................................ G01B 5/30
[58] Field of Search......................... 73/88 R, 89, 95

[56] References Cited
UNITED STATES PATENTS
| 924,427 | 6/1909 | Chapman | 73/88 R |
| 1,133,400 | 3/1915 | Rechniowski | 73/88 R |
| 3,082,621 | 3/1963 | Söderholm | 73/88 R |

Primary Examiner—James J. Gill
Assistant Examiner—Anthony V. Ciarlante
Attorney, Agent, or Firm—Bacon & Thomas

[57] ABSTRACT

An apparatus and method for determining variations in a dimension of a structural member caused by compressive or tensile forces acting on said member. The apparatus comprises an elongate member secured at or adjacent one end to said structural member and extending in the direction in which the variation is to be measured, and a position detector secured to the structural member adjacent the free end of the elongate member, the linear coefficient of thermal expansion of the elongate member and the structural member in said direction being equal and the arrangement being such that, in use, when the force acting on said structural member in said direction changes, the position detector (which is preferably a linear differential transformer) transmits a signal which is a function of the change in distance between the free end of said elongate member and said position detector.

A device is also disclosed which comprises an apparatus as described above in combination with a visual display meter.

2 Claims, 4 Drawing Figures

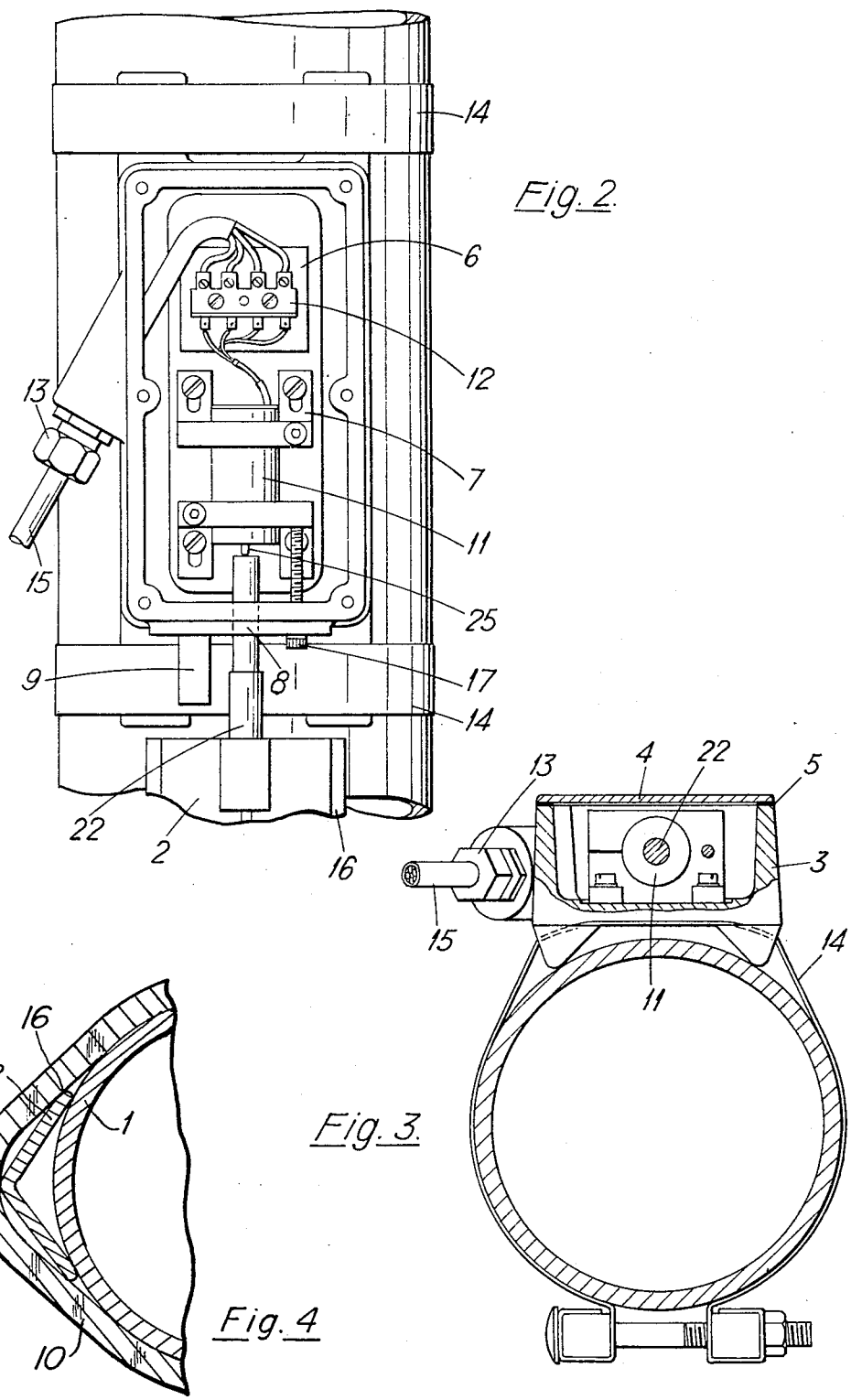

MEASURING APPARATUS

This invention relates to a method and an apparatus for determining variations in a dimension of a structural member caused by variations in the compressive or tensile forces acting on said member, and to a device incorporating such an apparatus for determining the weight of the contents of a bulk storage container.

Various methods have been proposed for determining the weight of the contents of a bulk storage container, for example a silo. One such method necessitates cutting each of the silo legs in a plane transverse to the longitudinal axis of the leg and inserting an electric laod cell between the two portions of each leg. To prevent the silo and the upper portions of the legs sliding off the lower portions of the legs, clamps are provided which resist relative lateral movement of the upper and lower portions of the legs and which allow the full weight of the silo to be transmitted to the load cells. As the weight of the silo contents changes, the electrical resistance of the load cells vary and the weight of the silo contends can thus be measured. It will be appreciated that the load cells are not readily mounted in the legs when the silo is full.

Another method of determing the weight of the silo contents involves reflecting ultra-sonic sound waves off the surface of the contents. While this method is satisfactory for liquids and some solid materials, it is not satisfactory for materials which undergo considerable volume reduction on compactiotn The problem of determining the weight of materials which undergo considerable compaction has been partly met by the use of a gamma-ray source at the bottom of the silo and a gamma-ray detector in the top. The intensity of radiation reaching the detector is a function inter-alia of the density of the material and the weight of the material can thus be found from this function. However, strict safety precautions have to be taken when such a source is used, and indeed, in some processes the use of gamma-ray radiation is prohibited by law, for example in food processing.

Fundamentally then the present invention is concerned with a method and an apparatus for measuring variations in a dimension of a structural member caused by compressive or tensile forces acting on said member.

Accordingly, in one aspect, the present invention provides an apparatus for determining variations in a dimension of a structural member caused by compressive or tensile forces acting on said member, which apparatus comprises an elongate member secured at or adjacent one end to said structrual member and extending in the direction in which the variation is to be measured, and a position detector secured to the structural member adjacent the free end of the elongate member, the linear coefficient of thermal expansion of the elongate member and the structural member in said direction being equal and the arrangement being such that, in use, when the force acting on said structural member in said direction changes, the position detector transmits a signal which is a function of the change in distance between the free end of said elongate member and said position detector.

The position detector is preferably a linear differential transformer, although other suitable position detectors, for example mechanical or conductance operated, may also be used.

The apparatus is not restricted to measuring the compression of silo legs with varying silo content weights and can be used for measuring, for example, variations in compression in bridge beams due to passing traffic, and variations in compression of buildings due to, for example, structural damage.

According to another aspect of the present invention, there is provided a method of measuring variations in a dimension of a structural member, which method comprises the steps of securing an elongate member to said structural member with the longitudinal axis of said elongate member extending in the direction in which the variation is to be measured, securing a position sensor to the structural member adjacent the free end of the elongate member, the linear coefficient of thermal expansion of the elongate member and the structural member in said direction being equal, and obtaining from said position sensor a signal which, in use, varies as a function of the change in distance between the free end of said elongate member and said position indicator caused by variations in the force acting on said structural member in said direction.

It is another object of the present invention to provide a device which is equally suitable for measuring the weight of solids and liquids in a container.

Accordingly, the present invention also provides a device for determining the weight of the contents of a bulk storage container which device comprises an apparatus in accordance with the invention as above set forth and a visual display meter connected to the position indicator so that, in use, variations in the weight of contents in said bulk storage container resolved as variations in the tensile or compressive forces in a structural member of said container are transmitted to said visual display meter by said position indicator, said visual display meter being calibrated to indicate the weight of said contents as a function of variations in the compressive or tensile forces in said structural member.

It will be seen that such devices are equally suitable for measuring the weight of solids and liquids in a container. In a preferred embodiment, a silo, one such device utilizes a long rod which has the same linear coefficient of thermal expansion as the silo leg, and one end of which is securely strapped to the leg of the silo. The rod extends generally parallel to the longitudinal axis of the leg. A position detector is mounted on the silo leg adjacent the free end of the rod. When the weight of the silo contents changes, the compression in the legs changes. This causes the length of the silo legs to change by a very small amount. However, the length of the rod is not affected by the change in compression of the leg and hence the relative distance between the free end of the rod and the position indicator changes by an amount which is a function of the variation in the compression and hence the weight of the silo contents. The rod and the silo leg are made of the same material, or at least materials with virtually the same linear coefficient of thermal expansion over the temperature range in which measurements will be made so that as the ambient temperature changes, and hence the temperature of the rod and the silo leg changes, they both expand or contract by the same amount over the length of the rod. An insulating jacket is preferably provided over the rod and the silo leg to inhibit draughts, rain, snow and the like causing the temperature of the rod to differ from the temperature of the silo leg. Furthermore, the rod, or at least a part thereof, is preferably maintained in conductive thermal contact with the leg.

The device can readily be fitted, for example to the leg of a silo which is already installed and in use. The visual display meter is then calibrated by putting known weights in the silo and marking the display meter accordingly.

Many bulk storage silos have capacities upwards of 300 tons of material. These silos are generally high in relation to their width. Thus, during loading, if the surface of the contents in the silo is uneven, any difference between the compression in each leg will be small relative to the compression in each of the legs. However, where the bulk storage container is with respect to its height, or where greater accuracy is required, an apparatus may be attached to more than one, or all of the legs. The variations in the compression in each leg can then be added together and their average taken for determining the weight of the contents. In a silo having four evenly spaced legs, reasonable accuracy may be obtained by attaching an apparatus to each of a pair of opposite legs.

Silos or bulk storage containers are generally kept between one quarter and three quarters full in normal operating conditions. This helps ensure that the silo is never completely empty or alternatively, overfilled.

To enable the display meter of the device to be calibrated more readily, a position indicator capable of transmitting over a relatively wide range a signal which is substantially a linear function of variations in the distance between the position sensor and the free end of the rod is preferably used. A linear differential transformer is advantageously used for this purpose. I have found linear voltage differential transformer No. P IS 1304 made by Messrs. Penny & Giles Limited, of MUDEFORD, CHRISTCHURCH, England most satisfactory. The linear differential transformer has the advantage that, knowing the dimensions of the legs supporting the bulk storage container, the display meter can be calibrated before the device is installed in a client's premises. In particular, since variations in the compression in a silo leg are proportional to the weight of the silo contents, and the signal transmitted by the linear differential transformer is linear, all that is necessary during installation is to establish a datum position for the meter, for example when the silo is emply, full or half-full.

For a better understanding of the invention, reference will now be made, by way of example, to the accompanying drawings, in which:

FIG. 2 is a view taken along line II—II of FIG. 1;

FIg. 3 is an underneath plan view, partly in section, of the part shown in FIGS. 1 and 2; and FIG. 4 is a fragmentary view taken along section IV—IV of FIG. 1.

Figure 1:
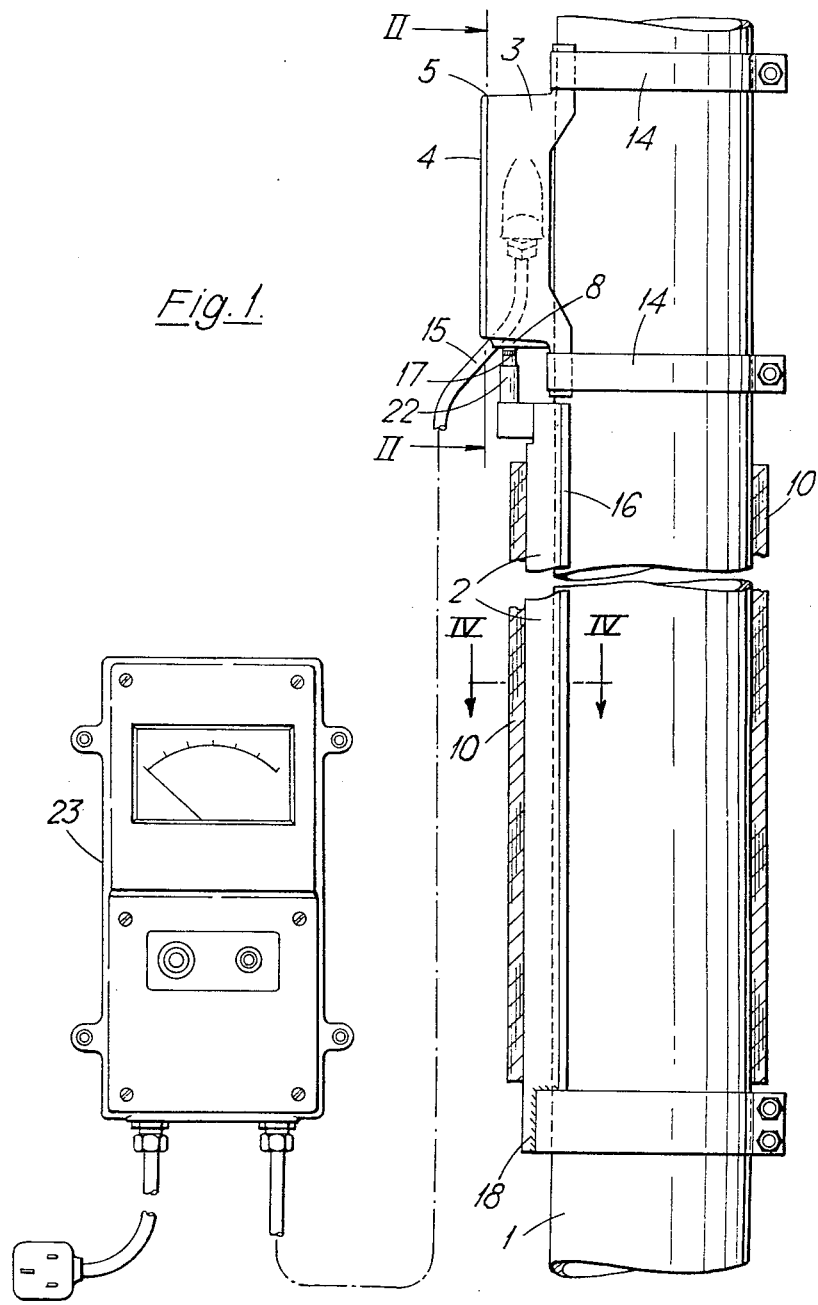
FIG. 1 shows a side view, partly in cross-section, of part of a device in accordance with the invention strapped to the leg of a silo and a display meter associated therewith.

Referring to FIGS. 1 to 3 of the drawings, there is shown a device for determining the weight of the contents of a bulk storage container. The device comprises an elongate unloaded rod 2 the lower end 18 of which is firmly strapped to one of the legs 1 of a silo (not shown). The unloaded rod is preferably between 18 and 84 inches long and extends generally parallel to the longitudinal axis of the leg 1. The unloaded rod 2 is made of the same material as the leg 1 and has the same coefficient of linear expansion as the leg 1.

A stepped rod 22 is welded to the free upper end of rod 2 and extends upwardly through a weather seal 8 into a case 3. The case 3 is firmly strapped to leg 1 by hose clips 14 and is provided with a lid 4 and a gasket 5 which prevents dust entering the case 3.

As shown in FIG. 2, a wiring diagram 6 and a terminal block 12 are secured to the back of case 3. A position sensor in the form of a linear differential transformer 11 known per se is mounted adjacent the free end of rod 22 on a sliding bracket 7. The free end of rod 22 is in contact with the core 25 of the transformer 11. The position of the transformer 11 can be varied by rotating socket screw 17 inwardly or outwardly of the case 3. A cable 15 enters the case 3 through a cable gland nut 13 and carries a 12 volt supply to the terminal block 12. A breather tube 9 extends downwardly from case 3 as shown.

When a load is placed in the silo, the compression in the legs increases. This reduces the length of the legs by an amount which is a function of the magnitude of the load. However, the length of unloaded rod 2 is unaffected by the load and hence the free end of rod 22 and linear differential transformer 11 move towards each other. This causes the core of the transformer 11 to rise upwardly and vary the inductance of the transformer in a manner such that the output of the transformer varies as a linear function of the variation in compression of the leg 1 of the silo. The output signal is relayed to a display meter 23.

When the size of the silo legs are known, it is possible to calibrate the display meter 23 before it is installed in a user's premises. Thereafter, all that is necessary during installation is to define a datum position for the meter, for example when the silo is empty, full or has a known contents weight. However, for many purposes it is sufficient to know whether a silo is between, for example one-fourth or three-fourths full and hence an estimated weight of the intitial contents may be used as a datum for the display meter. This datum can be altered subsequently by rotating socket screw 17 to move transformer 11 towards or away from rod 22.

The unloaded rod 22 and the adjacent part of the leg 1 are preferably covered by an insulating jacket 10 in order to maintain the rod 2 and leg 1 at substantially the same temperature. Furthermore, it will be noted that unloaded rod 2 is generally of angle construction with the rounded side edges 16 thereof in contiguous and conductive thermal contact with leg 1, as illustrated best in FIG. 4.

It should be understood that the present invention does not exclude the use of a non-linear position sensor, although it is pointed out that the calibration of the display meter with such a sensor would be more difficult and would have to be closely checked when the device is installed.

Since the compression per unit length of the leg of a silo is generally very small, it is preferable to use as long an unloaded rod as is reasonably practicable. Thus, for example, an 8 foot length of a silo leg of annular cross-section may be reduced, for example, by 0.015 inches when a load of 30 tons is put into the silo, whereas a 4 foot length of silo leg would only be compressed by 0.0075 inch for the same load.

What is claimed is:

1. An improved apparatus for determining variations in a dimension of a structural member such as a support member for a container caused by compressive or tensile forces acting on said member, the apparatus comprising an elongate member secured to said structural member and extending in the direction in which the variation is to be measured, the elongate member having a free end, a position detector coupled to the elongate member adjacent said free end of the elongate member, and said position detector being secured to said structural member, the position detector being capable of sensing a change in distance between the free end of said elongate member and said position detector, wherein the improvement comprises: said elongate member being of angular cross-section and having longitudinally extending side edges, said side edges only of the elongate member being contiguous and in good thermal contact with said structural member, the linear coefficient of thermal expansion of the elongate member and said structural member in said direction being equal, and thermal insulating means substantially covering the elongate member and said structural member adjacent the elongate member.

2. An improved apparatus as recited in claim 1, further wherein the improvement includes said side edges of the elongate member being formed of rounded configuration whereby good thermal contact between said elongate member and said structural member is obtained with relatively small total contact area between the members to thereby maximize freedom of relative movement between the elongated and structural members due to dimensional variations of the structural member.

* * * * *